United States Patent Office 3,534,107
Patented Oct. 13, 1970

3,534,107
PROCESS FOR THE PREPARATION OF MONOTHIOETHER DIOL
Yves Labat, Gelos, France, assignor to Societe Nationale des Petroles d'Aquitaine, Courbevoie, France
No Drawing. Filed May 8, 1967, Ser. No. 636,645
Claims priority, application France, May 9, 1966, 60,813
Int. Cl. C07c 149/02
U.S. Cl. 260—609    9 Claims

ABSTRACT OF THE DISCLOSURE

The invention relates to the preparation of monothioether diols having the structural formula $$HO-CH_2S-CH_2OH$$

in a pure state by introducing hydrogen sulfide into a formaldehyde solution in the proportion of $H_2S$ in the range from 0.2 to 0.5 mole per mole of formaldehyde at a temperature in the range from 0 to 75° C.

---

Monothioether diol is useful as an intermediate, particularly in various polycondensation reactions involving, for example, urea, melamine and phenols, for the purpose of obtaining resins which contain sulphur; it is also useful in connection with the preparation of such substances as polyesters, polyurethanes and polycarbonates and also various sulphur polymers and polythioether dithiols.

Although monothioether glycol or diol has been referred to in the literature, particularly in French patent specification No. 1,394,209, no method has so far been indicated for the preparation of this compound, other than in admixture or combination with other thioethers; attempts to isolate it from mixtures do not appear to have been successful, since the characteristics of the compounds have not been described hitherto. The methods used for its preparation hitherto, as described in French patent specifications No. 764,824, 767,899 and 1,394,209 for example, start from formaldehyde solution and hydrogen and lead to a mixture of polythioether dithiols and diols, of which the composition cannot be predetermined. Moreover, particularly, in the case of the most recent of the specifications referred to, the products which are obtained always contain $CH_2O$ groups as well as $CH_2S$ groups.

The present invention, on the contrary, makes it possible to produce in an economical manner and without requiring any elaborate or excessive equipment, the compound $HO-CH_2S-CH_2OH$ alone, or at least in a state of purity which is fully acceptable industrially.

The preparation of monothioether glycol from hydrogen sulphide and formaldehyde results from the reaction between 0.5 mol of $H_2S$ and 1 mol of HCHO in accordance with the theoretical transformation:

$$2HCHO+H_2S \rightarrow HO-CH_2S-CH_2OH \qquad (1)$$

This reaction is highly exothermic. In addition, monothioether glycol has a very high reactivity with respect to hydrogen sulphide, formaldehyde and water. If the reaction (1) is not strictly controlled, the products obtained may contain, in admixture with the monothioether glycol, longer chain products which are difficult to separate.

According to the invention there is provided a process with which it becomes possible to avoid these secondary reactions by conducting the main reaction in such manner that the parameters which regulate the combination of the reactants in the direction indicated in the transformation (1) are such that this reaction is not too rapid, and that the 0.5 mol of $H_2S$ introduced per mol of HCHO reacts with the formaldehyde present in the medium and not with the monothioether diol already formed.

The parameters which play the most important part in controlling the reaction (1) are the stirring speed, the supply of $H_2S$, the molar ratio of $H_2S$/HCHO and the temperature.

The process according to the invention thus consists in causing a stream of hydrogen sulphide progressively to enter a cooled aqueous formaldehyde solution with good agitation, without ever exceeding the proportion of 0.5 mol of $H_2S$ to 1 mol of HCHO, the supply of hydrogen sulphide and the agitation being regulated in such a way that the temperature does not reach 75° C., and preferably does not exceed 30° C., at any point of the reaction medium and at any time during the process.

The preferred overall temperature range of the reaction medium is from 0° to 30° C. At the lower temperatures within this range the reaction is relatively slow and the pH of the medium should be in the region of neutrality, while at higher temperatures, particularly in the region of 20° to 30°, the absorption of $H_2S$ must be very carefully controlled so as not to exceed 0.5 mol per mol of HCHO, but it is then possible to work at pH values of the order of 3 to 4, which are the values normally presented by commercial formaldehyde solutions.

When working between 0° and 5° C., with an aqueous formaldehyde solution of which the pH value has been adjusted to near neutrality (6.8 to 7), exactly 0.5 mol of $H_2S$ is fixed per mol of formaldehyde, it not being possible to exceed this quantity even if the bubbling of $H_2S$ is prolonged. Thus, at this temperature, there is effected automatic regulation of the quantity of $H_2S$ fixed by the formaldehyde, and the monothioether glycol which is obtained has a purity close to 100%.

One advantageous measure according to the invention consists in terminating the reaction with a slight excess of formaldehyde, so that eventually there is a little less than 0.5 mol, and preferably 0.44 to 0.49 mol, of HCHO. It may be possible to use 0.2 to 0.5 mols of $H_2S$ per mol of HCHO.

According to a preferred feature of the invention, the monothioether diol is extracted from aqueous solution as quickly as possible after it has formed. This extraction can be effected by means of another solvent, such as particularly ether. In this way, the compound is prevented from reacting with the constituents of the reaction medium, and in particular with the water therein. The extraction of the monothioether diol, or its separation by any other means, should take place within the period of 6 hours following the completion of its preparation and preferably within 2 hours, but best of all it should take place immediately after preparation.

According to another advantageous feature of the invention, the working conditions as indicated above are more easily fulfilled if the period for the introduction of the $H_2S$ is regulated in such a manner that at least 2½ hours elapse before 0.5 mol of $H_2S$ is combined with 1 mol of HCHO. The preferred reaction times for 0.5 mol of $H_2S$ to combine with 1 mol of HCHO are from 2½ to 5 hours, and particularly from 2¾ to 3½ hours.

The following nonlimiting examples illustrate the invention:

EXAMPLE 1

Into a 0.5 litre reactor which is immersed in a bath of water and ice, there are poured 167 ml. of a 36% formaldehyde solution (2 mols) which has perferably been adjusted to a pH value of 6.8 by means of sodium hydroxide solution.

The reactor is equipped with a supply tube for $H_2S$ dipping into the solution, an outlet for excess gas, a thermometer, a cooling coil and an agitator. A stream of $H_2S$ is caused to pass into the solution. The temperature is kept between 0° to 2° C. during the absorption of the $H_2S$ by the formaldehyde.

After 3 hours the solution has absorbed 33 g., i.e., 0.97 mol, of $H_2S$ (0.485 mol of $H_2S$ per mol of HCHO). The solution is then degasified and extracted several times with ether. The ether is distilled and there is left an oil of which the characteristics are given in the following table; these characteristics correspond very well to the calculated characteristics of monothioether diol. The yield is practically quantitative, that is to say, the quantity which one would expect from calculation.

| Monothioether diol, $HOCH_2SCH_2OH$ | Found | Calc. |
| --- | --- | --- |
| Density at 20° C | 1.319 | |
| Refractive index at 20° C | 1.538 | |
| Viscosity at 20° C. cps | 70 | |
| Molecular weight | 93 | 94 |
| Analysis: | | |
| Percent C | 26.17 | 25.53 |
| Percent H | 6.55 | 6.38 |
| Percent S | 33.20 | 34.04 |

The monothioether glycol or diol produced is stable at ambient temperature. It has a very high reactivity with respect to all compounds which react with OH-groups; it has a particularly high reactivity with respect to $H_2S$, with which it yields polythioether dithiols.

EXAMPLE 2

Into a 2-litre reactor, equipped with an agitator, a thermometer and a tube for the introduction of gaseous $H_2S$, there is introduced 1 litre of formaldehyde in 36% aqueous solution, i.e., 12 mols. The reactor is placed in a bath thermostatically controlled at the temperature of 25° C. The pH value of the solution is 3.8, corresponding to that of the commercial solution of formaldehyde. A current of $H_2S$ is passed through the solution.

The agitation and the supply of $H_2S$ are regulated in such a way that the temperature remains at 25° C., the external bath being a mixture of ice and water; at no point of the solution does the temperature locally exceed 30° C.

After 3 hours, the solution has absorbed 199 g. of $H_2S$, i.e., 5.87 mols, that is to say 0.489 of $H_2S$ per mol of HCHO; the reaction is then stopped. A stream of nitrogen is passed therethrough in order to drive off the $H_2S$ and the formaldehyde which have not reacted (about 7 g.). The aqueous and limpid solution is extracted with ether. By distillation of the ether and drying in vacuo, a clear oil is obtained with a practically quantitative yield. This oil is stable at ambient temperature and has the following characteristics:

| | |
| --- | --- |
| Refractive index | 1.539 |
| Molecular weight | 103 |
| Analysis: | |
| Percent C | 26.29 |
| Percent H | 6.53 |
| Percent S | 32.80 |

The product has a very high content of monothioether diol, containing about 96% of this latter.

EXAMPLE 3

This example illustrates, for the purposes of comparison, the influence of an excess of $H_2S$ on the progress of the reaction, that is to say, an excess with respect to an $H_2S$/HCHO ratio of 0.5. 12 mols of a 36% aqueous formaldehyde solution, pH value 3.8, are introduced into a reactor identical with that of Example 2. A current of $H_2S$ is caused to bubble therethrough, while maintaining the medium at 20° C., until 6.7 mols of $H_2S$ have been absorbed by the solution, that is to say, 0.56 mol of $H_2S$ per mol of HCHO present. A stream of nitrogen is caused to pass therethrough for driving off the $H_2S$ and the formaldehyde which have not reacted.

The solution is extracted with ether and an oil is isolated which has the following characteristics:

| | |
| --- | --- |
| Refractive index at 20° C. | 1.543 |
| Molecular weight | 157 |
| Percent S | 39.14 |

It will be seen that this composition differs substantially from the substantially pure monothioether diol prepared in the preceding examples.

What is claimed is:

1. Process for the manufacture of a monothioether diol composition consisting essentially of $$HO-CH_2-S-CH_2OH$$

having a refractive index at 20° C. of 1.538 to 1.539 a content by weight of sulphur of 32.8 to 33.2%, a viscosity at 20° C. of the order of 70 c.p.s. and an average molecular weight of 93 to 103, by introducing progressively hydrogen sulphide in a cooled and agitated aqueous formaldehyde solution, the proportion of $H_2S$ being in the range from 0.2 to 0.5 mole per mole of formaldehyde present, and the temperature of the reaction medium being in the range from 0° to 75° C.

2. A process according to claim 1 characterized in that the temperature does not exceed 30° C. at any point of the reaction medium.

3. A process according to claim 1, wherein the said proportion is from 0.44 to 0.49 mol of hydrogen sulphide per mol of formaldehyde present.

4. A process according to claim 1, wherein the process is controlled in such a way that the overall temperature of the reaction medium is maintained between 0° and 30° C.

5. A process according to claim 4, wherein a pH of the solution is adjusted as a function of the temperature in such a way as to have the value 7 at 0° C. and from 3 to 4 at between 30° and 20° C. respectively.

6. A process according to claim 1, wherein the introduction of hydrogen sulphide is regulated in such a way that it takes at least 2½ hours for 0.5 mol of hydrogen sulphide to be combined with 1 mol of formaldehyde.

7. A process according to claim 6, wherein the said combination takes from 2½ to 5 hours, and preferably from 2¾ to 3½ hours.

8. A process according to claim 1, wherein the monothioether diol is extracted from the reaction medium during a period of not more than 6 hours, and preferably not more than 2 hours, following its formation.

9. A process according to claim 8, wherein the monothioether diol is extrcated immediately after the completion of the preparation thereof.

References Cited

FOREIGN PATENTS 1,394,209    1965    France.

OTHER REFERENCES

Bogdanski et al. "Chem. Abstracts," vol. 54 (1960), pp. 17014–15.

CHARLES B. PARKER, Primary Examiner

D. R. PHILLIPS, Assistant Examiner